US010612240B2

United States Patent
Singleton (10) Patent No.: US 10,612,240 B2
(45) Date of Patent: Apr. 7, 2020

(54) FIBRE REINFORCED POLYMER STRUCTURES

(71) Applicant: Mark James Singleton, Malvern (GB)

(72) Inventor: Mark James Singleton, Malvern (GB)

( * ) Notice: Subject to any disclaimer, the term of this patent is extended or adjusted under 35 U.S.C. 154(b) by 0 days.

(21) Appl. No.: 15/763,214

(22) PCT Filed: Sep. 28, 2016

(86) PCT No.: PCT/GB2016/053012
§ 371 (c)(1),
(2) Date: Mar. 26, 2018

(87) PCT Pub. No.: WO2017/055837
PCT Pub. Date: Apr. 6, 2017

(65) Prior Publication Data
US 2018/0274236 A1    Sep. 27, 2018

(30) Foreign Application Priority Data

Sep. 30, 2015    (GB) .................................. 1517287.7

(51) Int. Cl.
*E04C 3/28* (2006.01)
*E04C 3/29* (2006.01)
(Continued)

(52) U.S. Cl.
CPC .................. *E04C 3/28* (2013.01); *E01D 6/00* (2013.01); *E04C 3/291* (2013.01); *F16B 7/18* (2013.01);
(Continued)

(58) Field of Classification Search
CPC ... E04C 3/28; E04C 3/291; E04C 3/10; E04C 2003/0491; E04C 2003/0486;
(Continued)

(56) References Cited

U.S. PATENT DOCUMENTS

| 121,916 A | 12/1871 | Tuthill | |
| 911,863 A * | 2/1909 | Adams | F16B 12/54 5/283 |

(Continued)

FOREIGN PATENT DOCUMENTS

| GB | 2011507 | 7/1979 |
| JP | H07166648 | 6/1995 |

(Continued)

OTHER PUBLICATIONS

Definition of the term "truss" provided by Merriam-Webster Dictionary.*

*Primary Examiner* — Brian D Mattei
(74) *Attorney, Agent, or Firm* — Renner Kenner Greive Bobak Taylor & Weber (57) ABSTRACT

A structure including a first hollow-section Fibre Reinforced Polymer (FRP) member, and a second hollow-section FRP member arranged at an angle to the first member. A rod extends through the second member. The rod also has a threaded end section extending through or into the first member. The opposed end of the rod is fixed to a further member. A nut secures the threaded end section to the first member, and screwing of the nut and threaded end section together exerts a compressive force on the second member and a tensile force on the rod.

12 Claims, 12 Drawing Sheets

(51) Int. Cl.
*F16B 7/18* (2006.01)
*E01D 6/00* (2006.01)
*E04C 3/10* (2006.01)
*E04C 3/04* (2006.01)
*E01D 101/00* (2006.01)

(52) U.S. Cl.
CPC ............ *E01D 2101/00* (2013.01); *E04C 3/10* (2013.01); *E04C 2003/0491* (2013.01)

(58) Field of Classification Search
CPC ...... E04C 2003/0495; E04C 3/08; F16B 7/18; E01D 6/00; E01D 2101/00
USPC ..................................... 52/645, 649.5, 650.2
See application file for complete search history.

(56) References Cited

U.S. PATENT DOCUMENTS

| | | | | | |
|---|---|---|---|---|---|
| 1,061,487 | A | * | 5/1913 | Moore ................. | A47C 19/022 411/513 |
| 1,136,010 | A | * | 4/1915 | Hendricks ............... | F16B 12/54 182/216 |
| 2,524,911 | A | * | 10/1950 | Horatschke ............... | E01D 6/00 403/217 |
| 4,475,840 | A | * | 10/1984 | Schmitt ................... | B63B 17/04 256/67 |
| 4,514,107 | A | * | 4/1985 | Moreno .................... | F16B 2/14 403/230 |
| 5,301,482 | A | * | 4/1994 | Aspenwall ................ | E04C 3/10 312/140 |
| 6,082,068 | A | * | 7/2000 | Fisher ....................... | E04C 3/08 211/182 |
| 618,928 | A1 | | 2/2001 | Zander | |
| 6,406,239 | B1 | * | 6/2002 | Mauri ....................... | F16B 7/18 411/178 |
| 2006/0042181 | A1 | * | 3/2006 | Foo ..................... | B63B 35/4413 52/633 |
| 2006/0245824 | A1 | * | 11/2006 | Bilsing ..................... | F16B 7/18 403/400 |
| 2006/0272110 | A1 | * | 12/2006 | de la Chevrotiere ..... | E01D 6/00 14/2.4 |
| 2009/0178352 | A1 | * | 7/2009 | Huff ........................ | E04C 3/10 52/223.8 |
| 2014/0237920 | A1 | * | 8/2014 | Burgess ................... | E04C 3/40 52/223.14 |
| 2016/0201842 | A1 | * | 7/2016 | Wang ....................... | F16B 7/18 248/678 |

FOREIGN PATENT DOCUMENTS

| | | |
|---|---|---|
| JP | 2000034802 | 2/2000 |
| JP | 2000153557 | 6/2000 |
| JP | 2001311217 | 11/2001 |
| WO | WO 85/02878 | 7/1985 |
| WO | WO 2004/044342 | 5/2004 |
| WO | WO 2010/040205 | 4/2010 |

* cited by examiner

FIBRE REINFORCED POLYMER STRUCTURES

TECHNICAL FIELD

The present invention relates to structures, for example trusses made using Fibre Reinforced Polymer. It is applicable in particular, though not necessarily, to trusses comprising pultruded Fibre Reinforced Polymer components.

BACKGROUND

Trusses are widely used in engineering and provide a materially efficient way to provide structural strength and an increased ability to bear heavy loads. A multitude of different truss designs exist but all comprise a number of assembled components. While the exact mechanical performance of each type of truss depends on the specific design in question, in general, trusses convert flexing loads into tension and compression loads which are more easily resisted by commonly used truss materials. This allows the truss to support a significantly greater load than would otherwise be possible if the materials were used in a non-truss configuration.

One type of widely used truss design is a Pratt truss (FIG. 1) whose components comprise two parallel chords connected by vertical and diagonal webs. In one example of a Pratt truss design, the parallel chords and the vertical and diagonal webs are hollow metal beams, welded together during assembly. An alternative example is where the components are wooden beams secured to each other during assembly by way of nuts and bolts where each of the beams meet.

Another widely used truss design is a Warren truss (FIG. 2) whose components comprise two parallel chords connected only by diagonal webs. Again, in one example of a Warren truss design, the parallel chords and the diagonal webs are hollow metal beams, welded together during assembly. An alternative example again is where the components are wooden beams secured to each other during assembly by way of nuts and bolts.

As trusses have been widely used in engineering since at least the mid-19$^{th}$ century, it will be appreciated that the skilled person will be well aware of the materials traditionally used to construct a truss as well as a number of traditional ways to connect its components during assembly, particularly in relation to wooden and metal trusses.

One modern development that has started to make its way into civil engineering is the use of lightweight materials that had previously only been used in other industries such as the aerospace and marine industries. One such class of material is Fibre Reinforced Polymer ("FRP"). FRP includes the class of materials known as Glass Reinforced Polymer (GRP). FRP has seen use as a building material in the Startlink Lightweight Building System™ and research into its potential scope and limitations is ongoing (see e.g. Zafari, B 2012, Startlink Building System and Connections for Fibre Reinforced Polymer Structures. Ph.D Thesis, University of Warwick). The use of FRP in construction was further described in a paper titled "The Development of Fibre-Reinforced Polymer (FRP) Composites in Building Construction", Mark Singleton and John Hutchinson, The second international conference on Sustainable Construction Materials and Technologies, Ancona, Italy, June 2010.

FRP components can be manufactured by way of a pultrusion process which lends itself well to making hollow-section parts which can be used as truss components. Pultrusion consists of coating reinforcing fibres with a resin before pulling them through a heated die in which the composite shape is cured and consolidated.

Despite being a lighter weight material, pultruded FRP is similar in strength to steel in tension and compression but not as stiff. As a truss' strength derives from, amongst other things, its components' ability to deal with tension and compression, FRP is a suitable class of materials from which to construct a truss in order to make it sufficiently stiff without having to use an uneconomical quantity of FRP components.

A skilled person will be aware that stiffness can be imparted by (a) making use of hollow-sections, (b) arranging the hollow-sections into a truss configuration, and (c) pre-stressing the truss to form a gentle camber by putting the upper parts of the truss into compression by applying tension below.

While FRP has seen prior use in truss configurations, such use is confined to embodiments that apply traditional connection and assembly methods that do not make use of FRP's full potential (see e.g. EP0418968B1 and Hizam, R. M. et al (2013) *A review of FRP composite truss systems and its connection*. In: 22nd Australasian Conference on the Mechanics of Structures and Materials (ACMSM22): Materials to Structures: Advancement through Innovation, 11-14 Dec. 2012, Sydney, Australia).

Much of the know-how relating to assembling, connecting and pre-stressing truss components that applies to metal and wooden materials is not applicable to or not particularly suitable for use with FRP. For example, it will be appreciated by the skilled person that welding FRP components together is not possible. One traditional method that has seen use with FRP is connecting components using steel nuts and bolts. An example of such a method being used with an FRP truss can be seen in Hizam 2013. However, this paper also demonstrates the types of failure that occur in bolted joints at the end of FRP sections. It should also be noted that the bolted sections are open sections like channel or bar which are not as effective as closed hollow sections which have improved buckling resistance, torsional rigidity and stiffness as the paper also demonstrates.

Therefore there is a need for a means to improve the structural integrity of FRP structures including trusses, and for a means of assembling FRP structures in such a way that appropriate levels of tension, compression and stiffness can be imparted and maintained when the structure is put into use.

SUMMARY

According to a first aspect of the invention there is provided a structure comprising a first hollow-section member, a second hollow-section member arranged at an angle to the first member and a rod extending through the second member. The rod has a threaded end section extending through or into the first member, the opposed end of the rod is fixed to a further member. A nut for securing said threaded end section to the first member is also provided wherein screwing of the nut and the threaded end section of the rod together exerts a compressive force on the second member and a tensile force on the rod.

The first and second members may be of Fibre Reinforced Polymer.

The further member may be a hollow-section Fibre Reinforced Polymer member and the opposed end of the rod is a threaded end section which extends into or through said further member. A further nut for securing that threaded end section to the further member may also be provided wherein screwing of the nuts around the respective threaded end sections places the rod under a tensile force.

According an embodiment, the first member defines a pair of holes, the holes being located on opposed sides of the member to define a passage for the first mentioned threaded end sections. The first member, and optionally the further member, comprises a spacer located within the member in order to brace it against a compressive force applied across it by the tightening of the nut (which may be located within said first member). A bar for insertion through the first member is also provided, wherein said spacer is integral or fixed to the bar.

According to an embodiment, a plurality of said second hollow sections and respective rods and nuts is provided. Each of the nuts and/or rods may be Fibre Reinforced Polymer.

According to a second aspect of the invention, there is provided a kit of parts for constructing a truss and comprising at least two hollow-section Fibre Reinforced Polymer (FRP) chords, a plurality of hollow section FRP webs, a plurality of rods having threaded end sections and configured to be located coaxially within respective webs, and a plurality of end nuts for engaging with the threaded end sections of the bars to secure the webs between the chords. Screwing of the nuts and the threaded end sections together exerts a compressive force on the chords and the webs and a tensile force on the rods.

According to an embodiment, each chord defines pairs of holes at intervals spaced apart along the length of the chord and each pair of holes comprises aligned holes in opposed sides of the chord such that a threaded end section and or associated nut is able to pass through one or both of the holes of a pair of holes. A bar for insertion longitudinally into each of said hollow chords is provided and comprises a plurality of spacers along it. The spacing of the spacers is such that the spacers can be aligned with respective pairs of holes to allow the threaded end sections to pass through the pairs of holes so that the spacers brace the chords against the tightening of the end nuts (which may be located in the chords). Said spacers may be hollow-section spacers such that, on alignment with the pairs of holes in the chords, the threaded end sections can pass through the spacers and the holes. The hollow-section chords and webs may comprise pultruded FRP and/or said rods and nuts may comprise FRP.

According to an embodiment, the threaded end sections, end nuts, and pairs of holes are configured to allow the chords to be connected together in substantially parallel alignment and to allow the webs to be connected transversely to the chords. The hollow section FRP webs may be configured to be coupled between adjacent ones of a first plurality of webs and the opposed chords such that they extend at an angle between the chords. Each of a second mentioned plurality of webs is also provided having a pair of holes at each end aligned to allow a threaded end section to pass therethrough.

According to an embodiment, the threaded end sections, end nuts, and pairs of holes are configured to allow the plurality of webs to extend at an angle between the parallel chords. Each of the plurality of webs comprises a pair of hollow-section sleeves for arrangement about the rod, and a pair of centre nuts for location around the rod between said sleeves. The centre nuts are configured to push the sleeves outwardly, towards the chords, upon tightening to clamp the sleeves between the centre nuts and the chords.

According to a third aspect of the invention, there is provided a truss constructed using the kit of parts of the second aspect of the invention.

According to a fourth aspect of the invention, there is provided a method for assembling the truss of the third aspect comprising engaging the end nuts with respective threaded end sections of the rods, about or within the chords, and screwing the nuts and the threaded end sections together to exert a compressive force on the chords and the webs and a tensile force on the rods.

According to an embodiment, the method comprises inserting bars into respective hollow-section chords to align the spacers with respective pairs of holes, inserting the threaded end sections through respective pairs of holes, and attaching the end nuts to respective threaded end sections and tightening the nuts in order to clamp the webs and the chords together. The step of inserting the threaded end sections through respective pairs of holes may comprise inserting the threaded end sections also through the hollow-section spacers. The threaded end sections may be inserted through holes in the second mentioned plurality of webs prior to being inserting the threaded end sections through the holes in the chords.

According to an embodiment, the method comprises, for each web, inserting a first of the threaded end sections through a pair of holes in a first of the chords and screwing that end section through the associated end nut so that it projects out of the end nut. The second of the threaded end sections is then inserted through a pair of holes in the second of the chords, and the associated end nut attached to that threaded end. Said first of the threaded ends is engaged and rotated to screw the second of the threaded end section into the associated end nut. The centre nuts are screwed around the threaded rod to clamp the sleeves between the centre nuts and the chords.

According to a fifth aspect of the invention, there is provided a substantially planar truss comprising a pair of substantially parallel chords and a plurality of webs connected between the chords. The truss further comprises at least one guide rod extending substantially parallel to the chords, the rod being coupled to opposed ends of one of the chords via respective threaded connections such that one or both of the threaded connections can be used to pre-stress the truss.

According to an embodiment, the at least one guide rod is offset from the truss in the plane of the truss, and each threaded connection comprises a threaded end section of said rod, a clamp coupled to an end of the chord and defining a passage through which said threaded end section extends, and a nut engaging said threaded end section to secure the guide rod to the clamp, whereby tightening of the nut results in a pre-stressing of the truss. A sleeve surrounding said guide rod and extending substantially between the clamps is also provided to thereby limit the extent to which the nuts can be tightened.

According to an embodiment, each threaded connection comprises a threaded end section of said rod, a mounting plate coupled to an end of the chord, extending transversely in both directions from the plane of the truss and defining a passage through which said threaded end section extends, and a nut engaging said threaded end section to secure the guide rod to the clamp, whereby tightening of the nut results in a pre-stressing of the truss. A sleeve surrounding said guide rod and extending substantially between the clamps is also provided to thereby limit the extent to which the nuts can be tightened.

The truss may be assembled using the kit of parts of the second aspect of the invention.

According to a sixth aspect of the invention there is provided a bridge constructed using a plurality of structures and/or trusses according to the first to fifth aspects of the invention. The bridge comprises at least one truss arranged parallel to the longitudinal direction of the bridge and a plurality of trusses arranged transverse to the longitudinal direction of the bridge.

DETAILED DESCRIPTION

Figure 1:
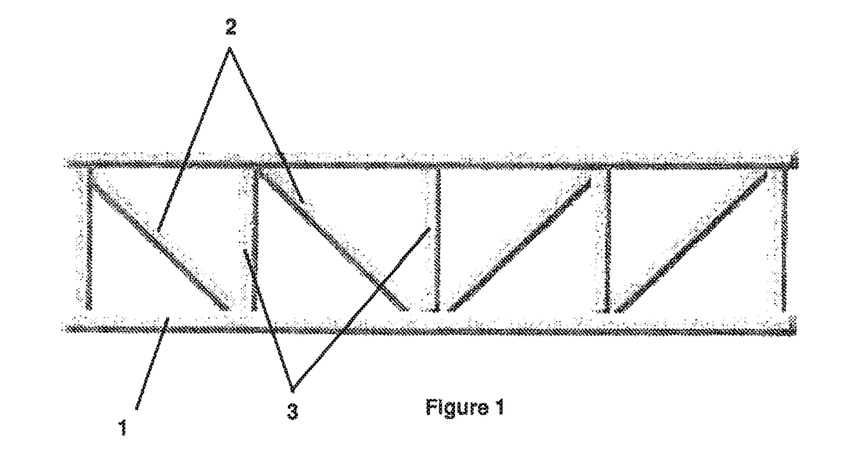
FIG. 1 shows a prior art Pratt truss design.
Figure 2:
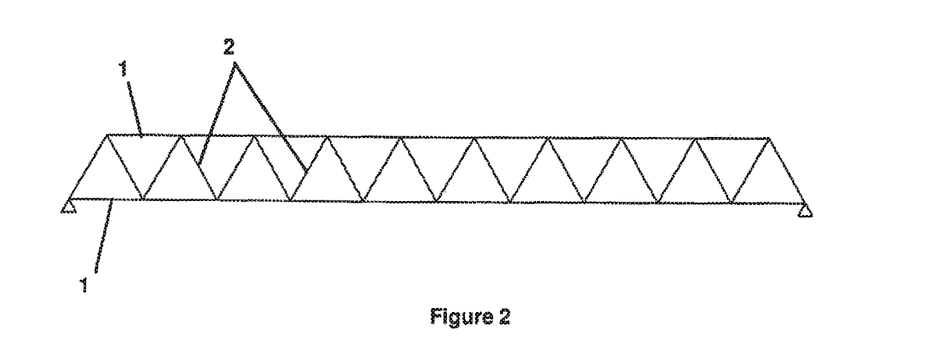
FIG. 2 shows a prior art Warren truss design.

FIGS. 1 and 2 show well known prior art Pratt and Warren truss designs respectively. Each comprises two chords 1 and a plurality of diagonal 2 and/or vertical webs 3. These prior art designs are assembled and held together using traditional methods such as nuts and bolts, and welding. In order to address certain short comings of the trusses in FIGS. 1 and 2, improvements will now be described with reference to FIGS. 3 to 10.

Figure 3:
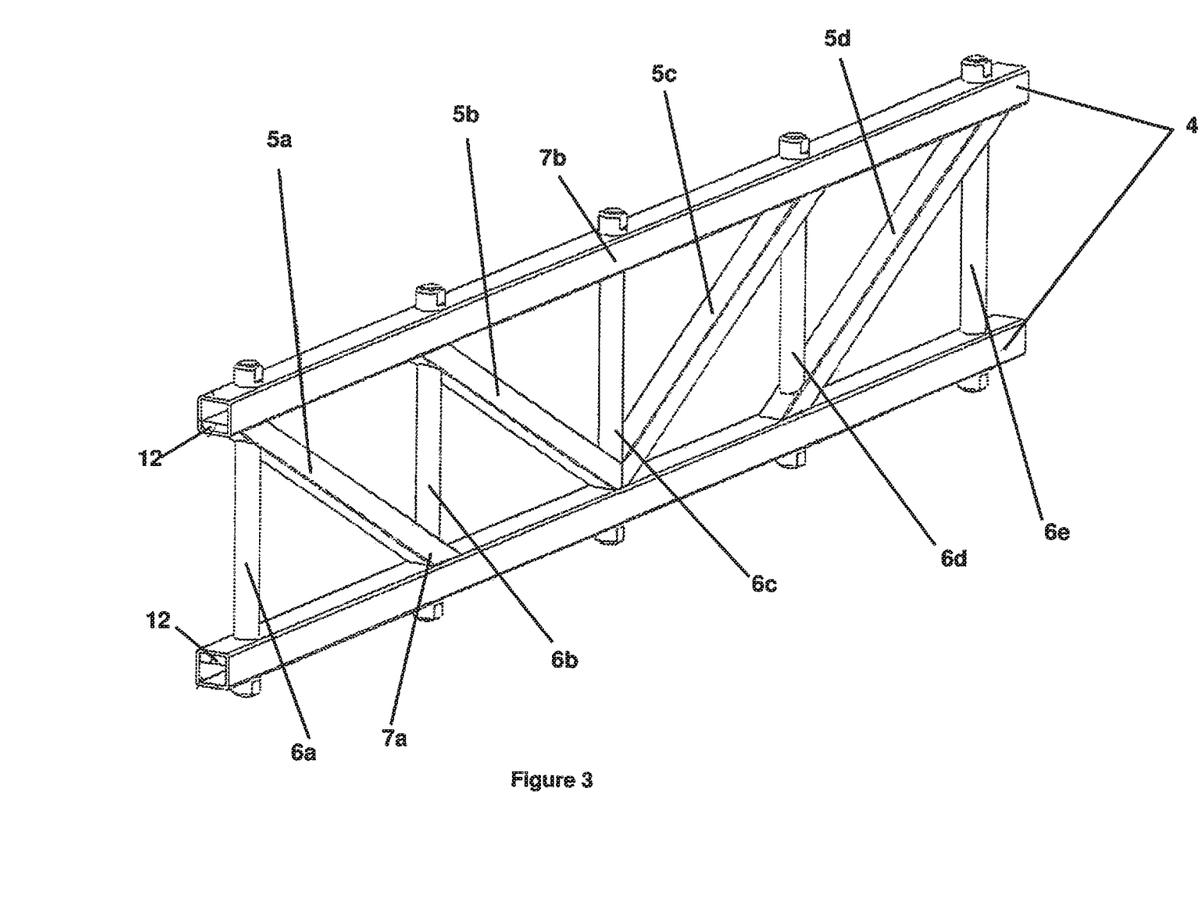
FIG. 3 shows a Pratt truss according to the first embodiment.
Figure 4:
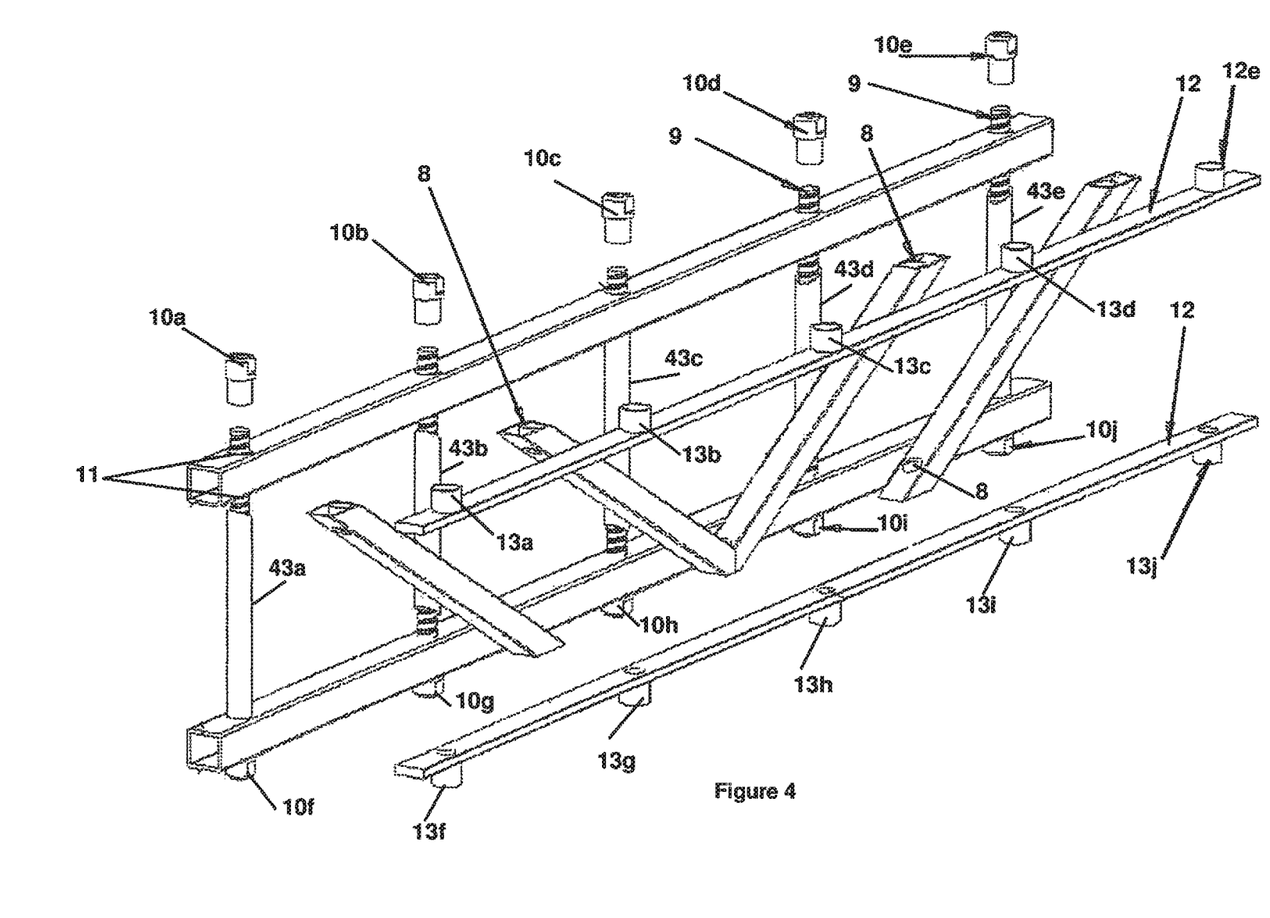
FIG. 4 shows an exploded view of the Pratt truss of FIG. 3.

FIGS. 3 and 4 show an embodiment (one in assembled view and one in exploded view) comprising a Pratt truss made entirely out of Fibre Reinforced Polymer (FRP), for example Glass Reinforced Polymer (GRP), whose components comprise two parallel (extending horizontally in the Figure), spaced chords 4 and a plurality of diagonal 5a-5d and vertical 6a-6e webs that meet at joints. In this embodiment, the chords 4 and diagonal webs 5a-5d are square profile hollow-sections whereas the vertical webs 6a-6e comprise circle profile hollow-sections 43a-43e. In this embodiment, at the joint 7a where each of a diagonal web, a vertical web and a chord meet, the vertical web does not touch the chord but only touches the diagonal web which itself touches the chord instead. At joint 7b where each of a vertical web and a chord meet, the vertical web does touch the chord.

The ends of the vertical webs 6a-6e that meet at the same joint 7a as a diagonal web and chord are cut at an angle to match the surface of the diagonal web against which that particular vertical web end comes into contact with at that joint. The ends of vertical webs 6a-6e that meet only a chord at a joint 7b remain flat (i.e. perpendicular to the vertical alignment of the vertical web).

The ends of each of the diagonal webs 5a-5d is cut at an angle to match the surface of the chords against which that particular diagonal web end comes into contact with. Built into the two ends of each diagonal web is a hollow tube 8 aligned with the corresponding vertical web that meets the diagonal web at that joint. One end of this tube opens out of the open end of the diagonal web on the side that meets a chord while the other opens out through the side of the diagonal web that meets the end of a vertical web. The ends of the hollow tube 8 are cut to match the angles of the sides of the diagonal web from which they emerge.

A threaded rod 9 of FRP with continuous threading is located concentrically within each of the vertical webs 6a-6e. This threaded rod 9 is of greater length than the distance between the two chords 4 such that the vertical web can be said to have protruding threaded end sections. The threading on the threaded rod 9 is sufficiently course, and of suitable depth, to ensure that the strength of the FRP material is not significantly compromised by the thread. Rather than being continuously threaded along its entire length, the rod 9 may be threaded only at its ends. In this case, the central, non-threaded region of the rod may have any appropriate cross-section, e.g. round, square, etc.

The opposing inner and outer sides of the chords are lined with pairs of opposing, aligned holes 11. A spacer bar 12, lined with a plurality of hollow spacers 13a-13j, for insertion into the chords 4 is also provided. The hollow spacers 13a-13j are spaced along the spacer bar such that the position of each of the hollow spacers 13a-13j matches and aligns with a respective pair of holes in the chords 4. The spacer bar 12 is similarly lined with holes such that each hole matches and aligns with the hollow spacers. The spacer bar in the illustrated example has a rectangular cross-section. However, the shape may be any suitable shape.

A plurality of end nuts 10a-10j are provided and configured to engage with the threaded end sections of the bar 9. The nuts are also constructed using FRP. The outer profile of each end nut 10a-10j provides an enlarged head and a narrower sleeve section. The inner thread extends through the head and sleeve. The outer diameter of the sleeves is slightly smaller than the inner diameter of the spacers 13a-13j.

Figure 5:
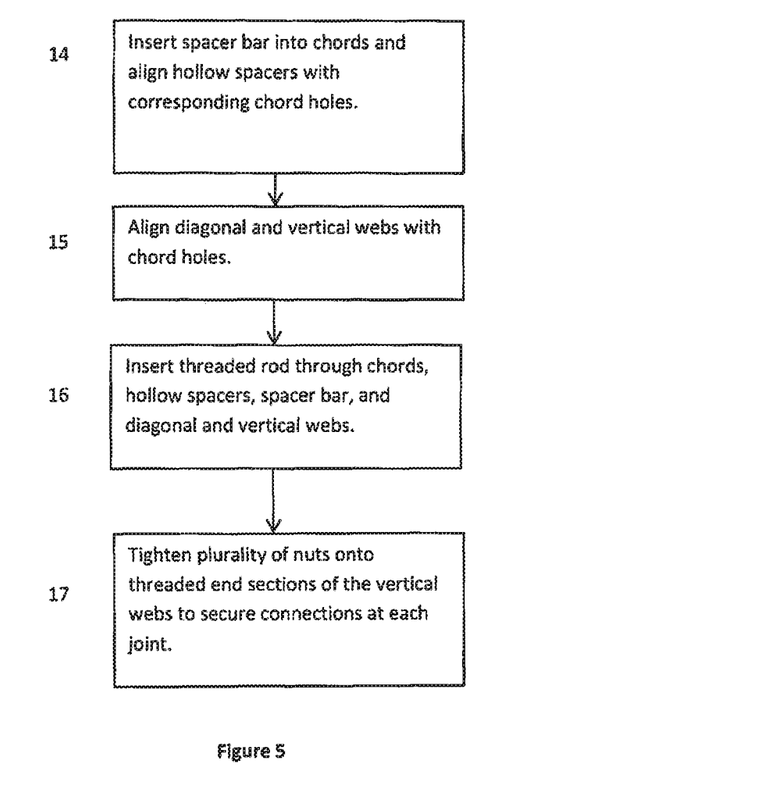
FIG. 5 is a flow diagram showing a process of assembling the Pratt truss of FIGS. 3 and 4.

FIG. 5 is a flow diagram showing how the embodiment in FIGS. 3 and 4 is assembled. At 14, the spacer bar 12 is inserted into the chords 4 such that the spacers 13a-13j align with the opposed pairs of holes 11 in the chords. At 15, the vertical 5a-5d and diagonal 6a-6e webs are aligned with the corresponding pairs of holes 11 in the chords. For the diagonal webs, this alignment means that the hollow tubes 8 built into the diagonal members align with a corresponding pair of holes in the chords. For the vertical webs, this alignment means aligning the circle profile hollow-sections respective pairs of holes in the chords.

At 16, once the vertical 5a-5d and diagonal webs 6a-6e are aligned with the chords, each of the threaded rods 9 is inserted from the top, through a hole in the outer side of one chord and through the corresponding spacer on the spacer bar. The threaded rod is then pushed further through the corresponding hole in the inner side of the same chord and through the corresponding hollow tube built into the aligned diagonal web. The threaded rod then passes through the vertical webs and then through the lower chord and internal spacer. Once fully inserted, threaded end sections of the bar 9 protrude outwardly from the upper and lower chords 4.

At 17, the plurality of end nuts 10a-10j are screwed onto the projecting threaded end sections and tightened until the sleeves of the end nuts are fully inserted into the spacers 13 and the heads firmly abut the outer surfaces of the chords. This secures the connections at each of the joints by firmly clamping the webs between the chords.

The process of tightening the end nuts results in compression of the chords and of the vertical and diagonal webs. Conversely, the threaded rods are under tension. This compression and tension imparts an extremely high degree of stiffness into the truss joints. This increased stiffness improves the truss' ability to bear a load and in particular to resist bending moments. Furthermore, the hollow spacers 13 serve the purpose of bracing the opposed sides of each of the chords against the forces created by the tightening of the end nuts. Without such bracing, there is a risk that the chords will be crushed during tightening of the nuts or when external forces are applied to the truss.

Figure 6:
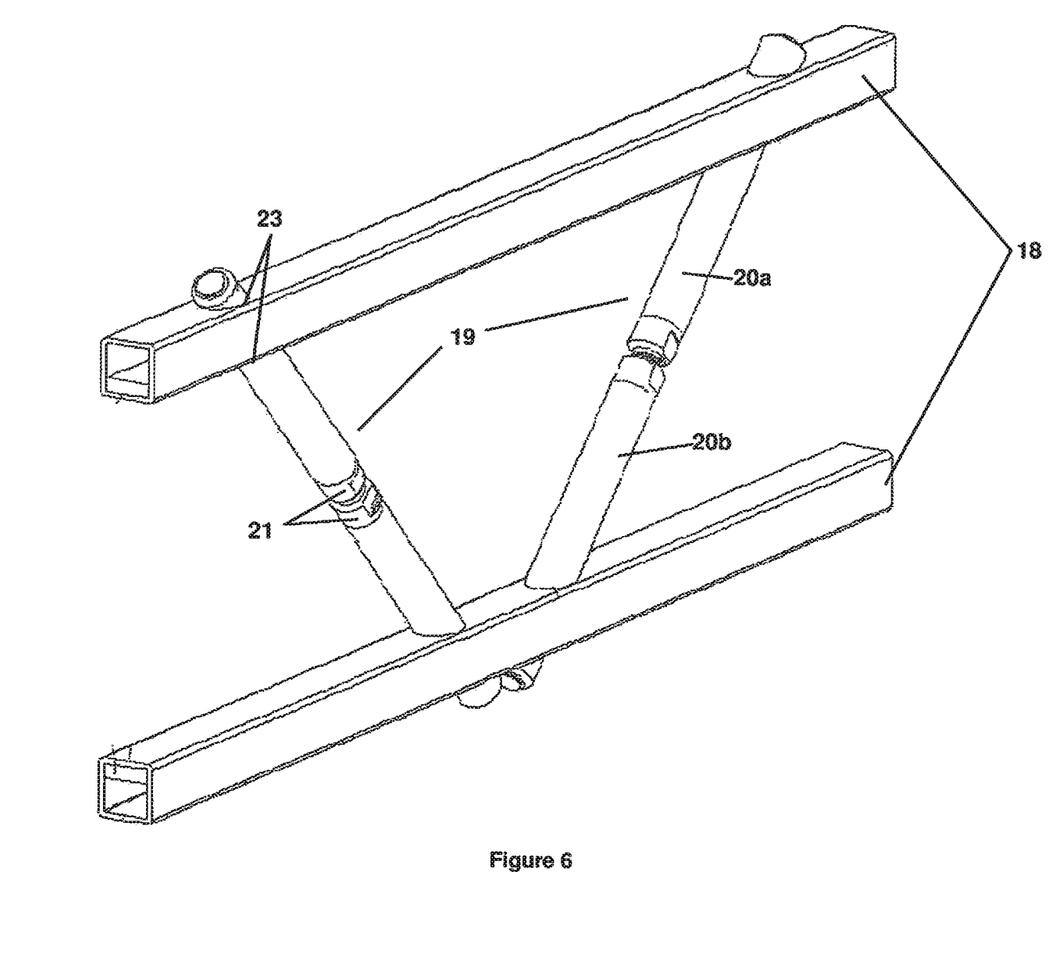
FIG. 6 shows a Warren truss element according to another embodiment.
Figure 7:
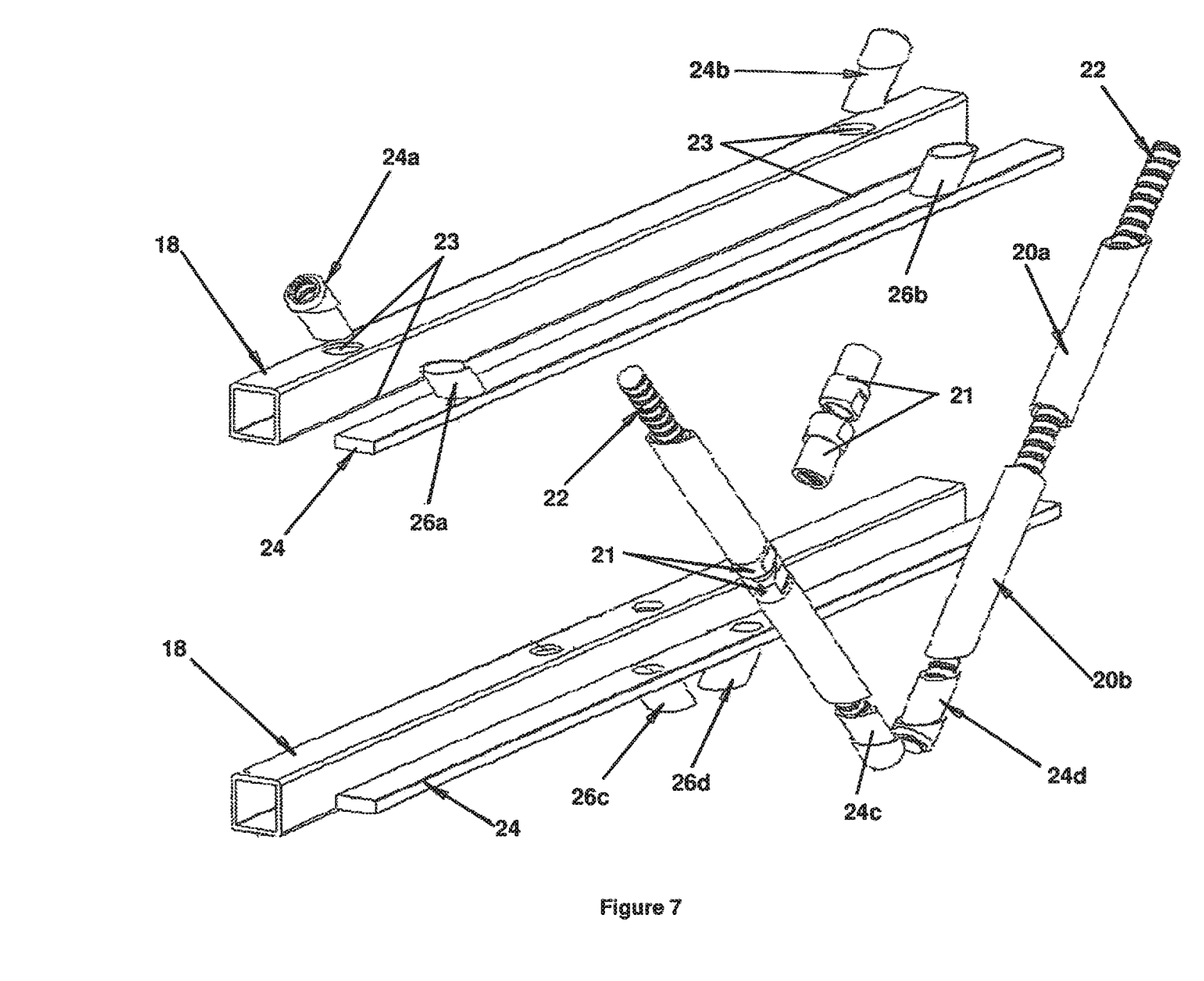
FIG. 7 shows an exploded view of the Warren truss element of FIG. 6.

FIGS. 6 and 7 show an embodiment (one in assembled view and one in exploded view) comprising an element of a Warren truss made entirely out of FRP. The components comprise two parallel, separated chords 18 and two diagonal webs 19 each oriented at an opposite angle from the vertical. In this embodiment, the chords 18 are again square profile hollow-sections and the diagonal webs 19 are circle profile hollow-sections divided into upper and lower sleeves 20a-20b. Each end of a diagonal web 19 that touches a chord 18 is cut at an angle such that it lies flush against the surface of the chord it touches.

A pair of centre nuts 21 is also provided to divide the upper and lower sleeves of each web 19. Each centre nut has an enlarged head on one end with a radius that is substantially the same as the radii of the web 19. Each nut has a narrower sleeve section that fits inside the opposed upper and lower sleeves 20a-20b of the web 19.

A threaded rod 22 with continuous threading is located concentrically inside each web 19. The threaded rod 22 is of sufficient length to protrude from each end of the web 19 such that the diagonal webs can be said to have threaded end sections. Again, the threading on the threaded rod 22 is sufficiently course to ensure that the integrity of the bar is not compromised.

Along the length of the chords 18, the opposing inner and outer sides of the chords are lined with pairs of holes 23. The holes of each pair are offset from one another, at an angle aligned with the angle of the diagonal webs 19.

A plurality of end nuts 24a-24d are also provided. The inner ends of the end nuts are shaped at an oblique angle. A spacer bar 24 lined with a plurality of hollow spacers 26a-26d for insertion into the chords 18 is also provided. The hollow spacers 26a-26d are at an oblique angle aligned with the axes of the diagonal webs 19. The hollow spacers are spaced along the rod 24 such that they align with respective pairs of holes in the chords.

Figure 8:
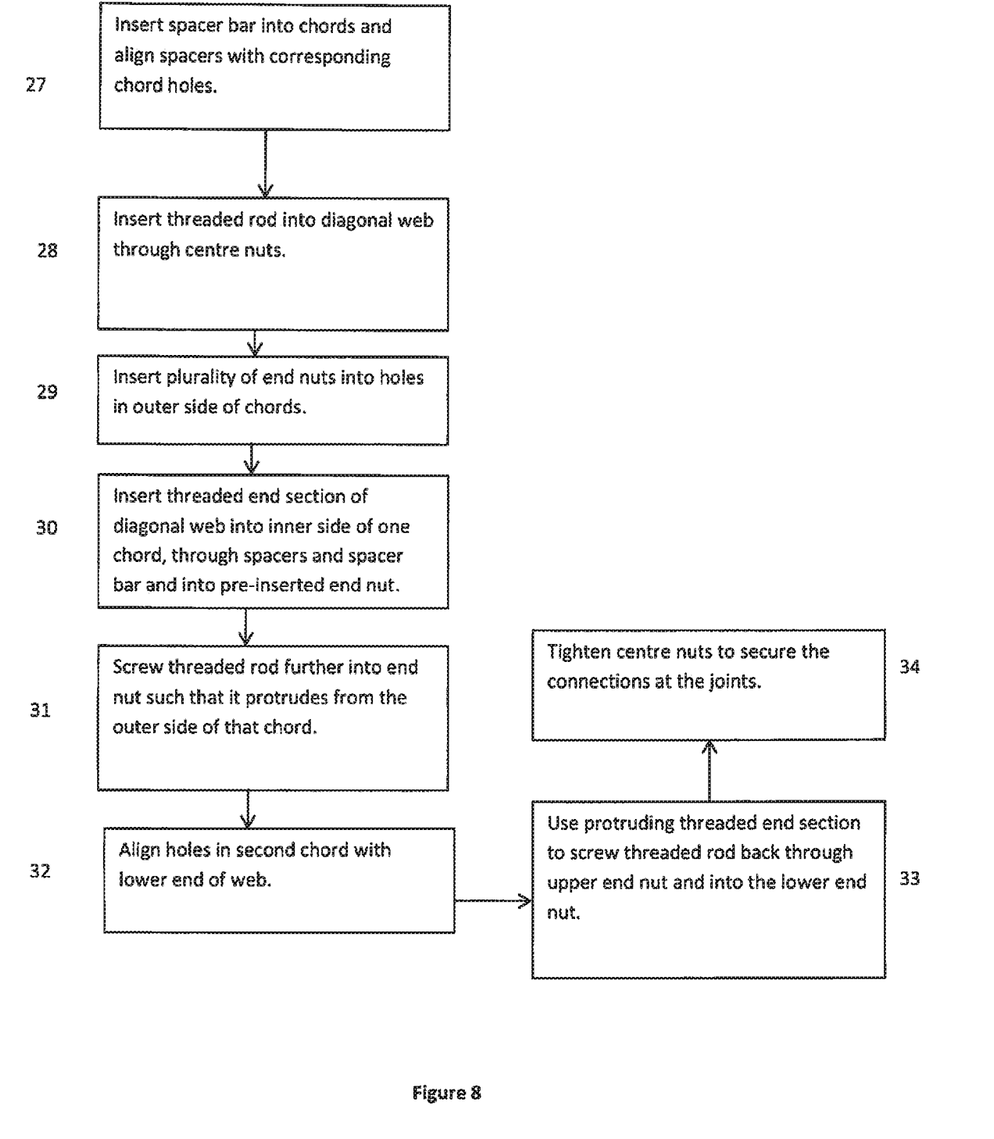
FIG. 8 is a flow diagram showing a process of assembling the Warren truss element of FIGS. 6 and 7.

FIG. 8 is a flow diagram showing how the embodiment of FIGS. 6 and 7 is assembled. At 27, the spacer bars 24 are inserted into respective chords such that the hollow spacers and holes in the rod are aligned with the pairs of holes in the opposing inner and outer sides of the chords. At 28, each threaded rod 22 is inserted into the pair of sleeves forming the associated diagonal web, including screwing the rod through the pair of centre nuts between the sleeves.

At 29, the plurality of end nuts 24a-24d are inserted into corresponding pairs of holes in the chords. At 30, the diagonal webs and threaded rods are aligned with the axes of the pairs of holes, hollow spacers and end nuts in the first, e.g. upper, chord. As this embodiment is a Warren truss, the angle of each alternating axis mirrors the axis of the adjacent one. The upper threaded end section of each bar is then inserted through the first hole on the inner side of the upper chord to engage the already inserted nut. The diagonal web is then rotated about its axis such that it screws into the end nut. This rotation can, for example, be carried out manually with tools such as a pipe wrench or a screwdriver (if a screw head shape has been formed on the opposed end surface of the threaded rod).

At 31, the threaded rods are further screwed into the end nuts such that they protrude out of the upper ends of the nuts. At this stage the lower ends of the threaded rods sit wholly within the lower end of the respective webs. This allows the lower ends of the webs to be aligned with corresponding pairs of holes in the lower chord at 32.

At 33, once the lower ends of the webs are aligned with the lower chord, the protruding upper ends of the threaded rods are rotated to screw the bars back through the upper end nuts causing the lower ends of the bars to be screwed into the lower end nuts (previously inserted into holes in the lower chord).

At 34, for each web, the pair of centre nuts 21 dividing the upper and lower parts are tightened in opposite outward directions such that these parts are compressed between the centre nuts and the respective chords. The tightening of the centre nuts will also compress the chords and put the threaded rod under tension. This compression and tension imparts a high degree of stiffness onto the FRP components.

Figure 9:
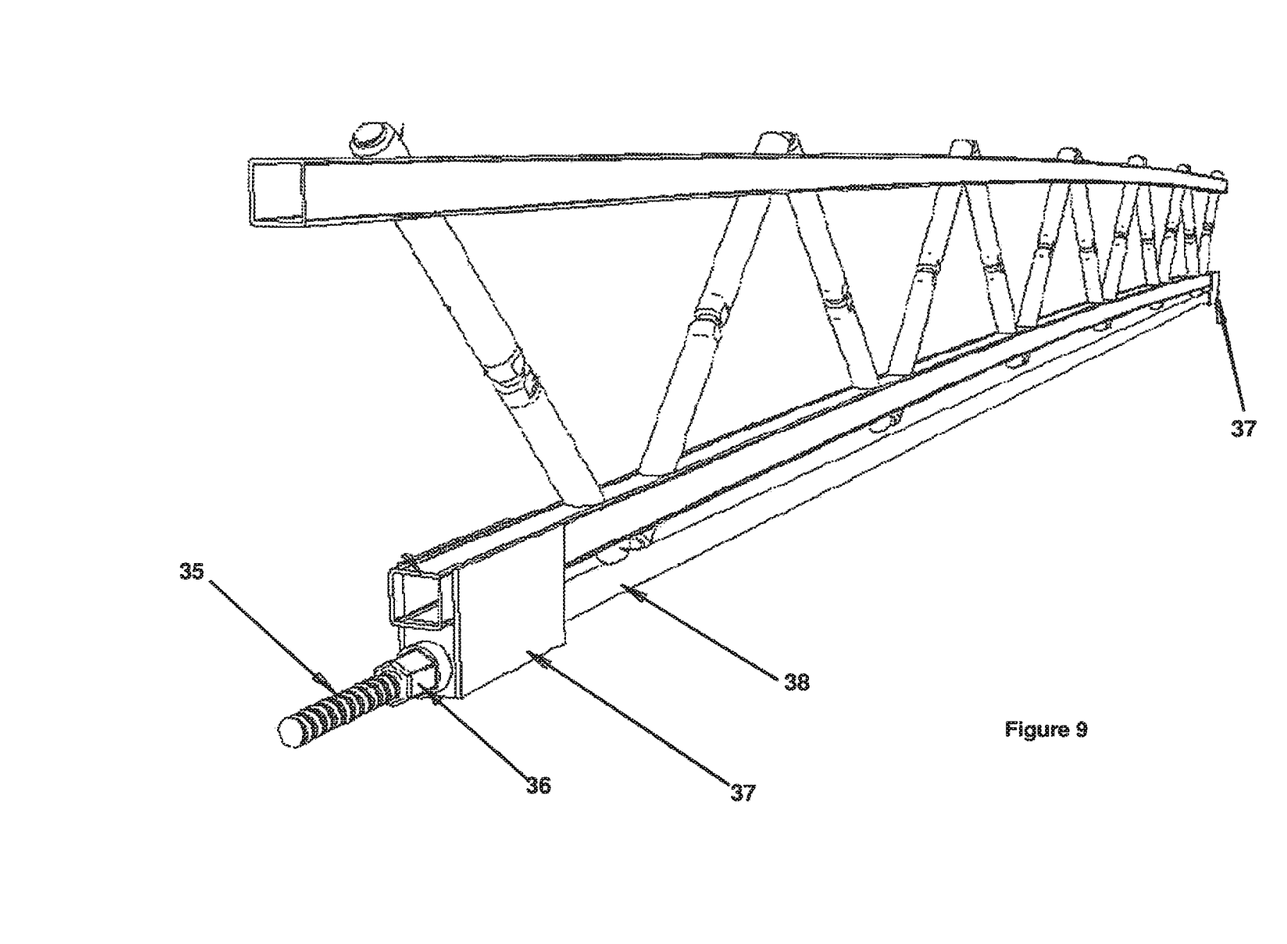
FIG. 9 shows a Warren truss according to a further embodiment.
Figure 10:
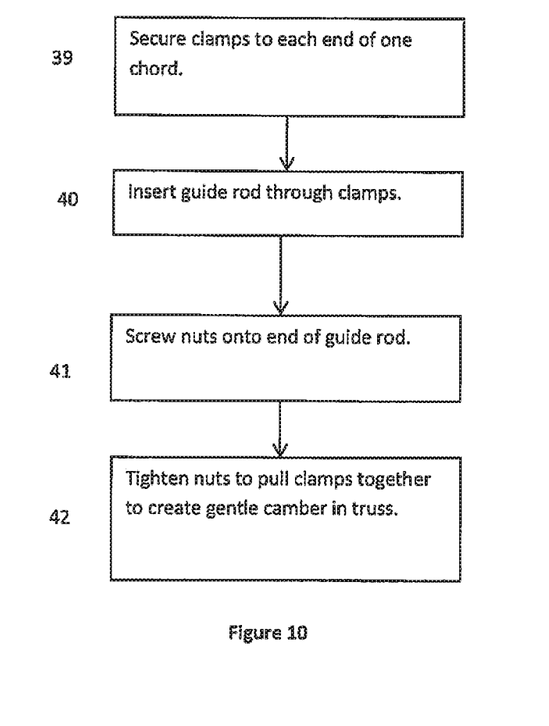
FIG. 10 is a flow diagram showing a method of pre-stressing the Warren truss of FIG. 9.

FIG. 9 shows an embodiment of a planar Warren truss assembled from the truss elements of FIGS. 6 and 7. The embodiment further comprises a guide rod 35 of greater length than the chords extending substantially parallel to but also at an offset to the chords in the plane of the truss. The guide rod 35 further includes threaded end sections but may also be threaded continuously along its entire length. Nuts 36 configured to engage with the threaded end sections of the guide rod 35 are provided. A pair of clamps 37 is also provided. The clamps 37 are secured to the lower truss chord and each has hole through which the guide rod 35 passes. A cylindrical sleeve 38 surrounds the guide rod 35, FIG. 10 is a flow diagram showing a method of pre-stressing the Warren truss of FIG. 9. At 39, a clamp 37 is secured to each end of the lower truss chord. At 40, the guide rod 35 is inserted through the clamps, and the nuts 36 are secured to each projecting threaded end section. At 41 and 42, the nuts are tightened until they come into contact with the outwardly facing surfaces of the respective clamps. Further tightening of the nuts pulls the clamps together, pre-stressing the truss and forming a gentle camber along its length.

It is noted that, at the point where the inwardly facing surfaces of the clamps come into contact with the sleeve 38, the sleeve is placed under compression and any significant further pre-stressing of the truss is prevented.

Figure 11:
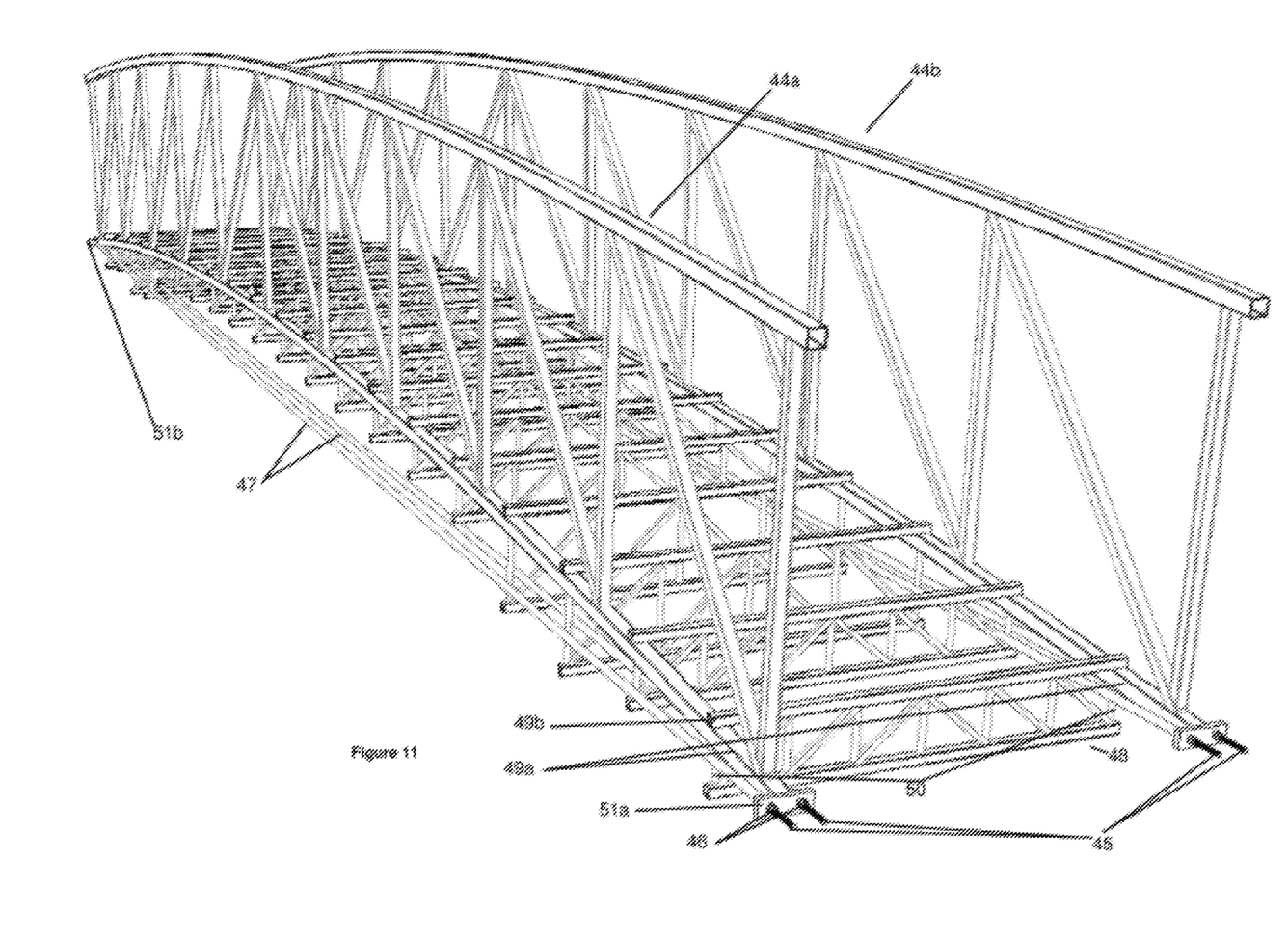
FIG. 11 illustrates schematically a bridge constructed according to a Howe truss design.

FIG. 11 illustrates schematically a bridge structure constructed using a plurality of Howe trusses according to a Howe truss configuration of the design of FIG. 3. Two substantially planar trusses 44a, 44b, are arranged parallel to the longitudinal direction of the bridge. A plurality of Howe trusses 48 are arranged transverse to the longitudinal direction of the bridge at regular intervals. Each of the transverse trusses 48 is connected at its ends to the planar trusses 44a, 44b.

In accordance with FIG. 3, each truss 44a, 44b, 48 comprises chords 49a, 49b and vertical webs 50. The upper and lower sides of chords 49a are lined with pairs of matching holes at regular intervals. The vertical webs 50 at each end of each of the transverse trusses 48 pass through a pair of matching holes in the chords 49a of the planar trusses 44a, 44b to connect the transverse trusses 48 to the planar trusses 44a, 44b.

Four guide rods 45 are arranged parallel to the longitudinal direction of the bridge, two on each side. For each pair of guide rods, pairs of matching mounting plates 51a, 51b each with a width greater than the width of the chords 49a are arranged in contact with opposite ends of the chords 49a such that a portion of each mounting plate 51a, 51b extends transversely in both directions from the plane of the planar trusses 44a, 44b. Each extended portion defines a hole. Each guide rod 45 connects a hole in one mounting plate 51a at one end of the chords 49a to a matching hole in a mounting plate 51b at the opposite end of the chords 49a. The guide rods 45 are threaded at each end or may be threaded along their entire length and are secured to the mounting plates 51a, 51b with nuts 46. Each guide rod 45 is surrounded by a sleeve 47. Tightening the nuts 46 pulls the mounting plates 51a, 51b together and applies a compressive force to the chords 49a and to the sleeves 47. The compressive force on the chords 49a pre-stresses the planar trusses 44a, 44b to form a gentle camber along their length. The guide rods 45 running through the sleeves 47 prevent the sleeves 47 from bending out of shape or buckling.

A continuous composite floor panel (not shown) may be curved over the transverse trusses 48 to form a bridge floor.

Figure 12:
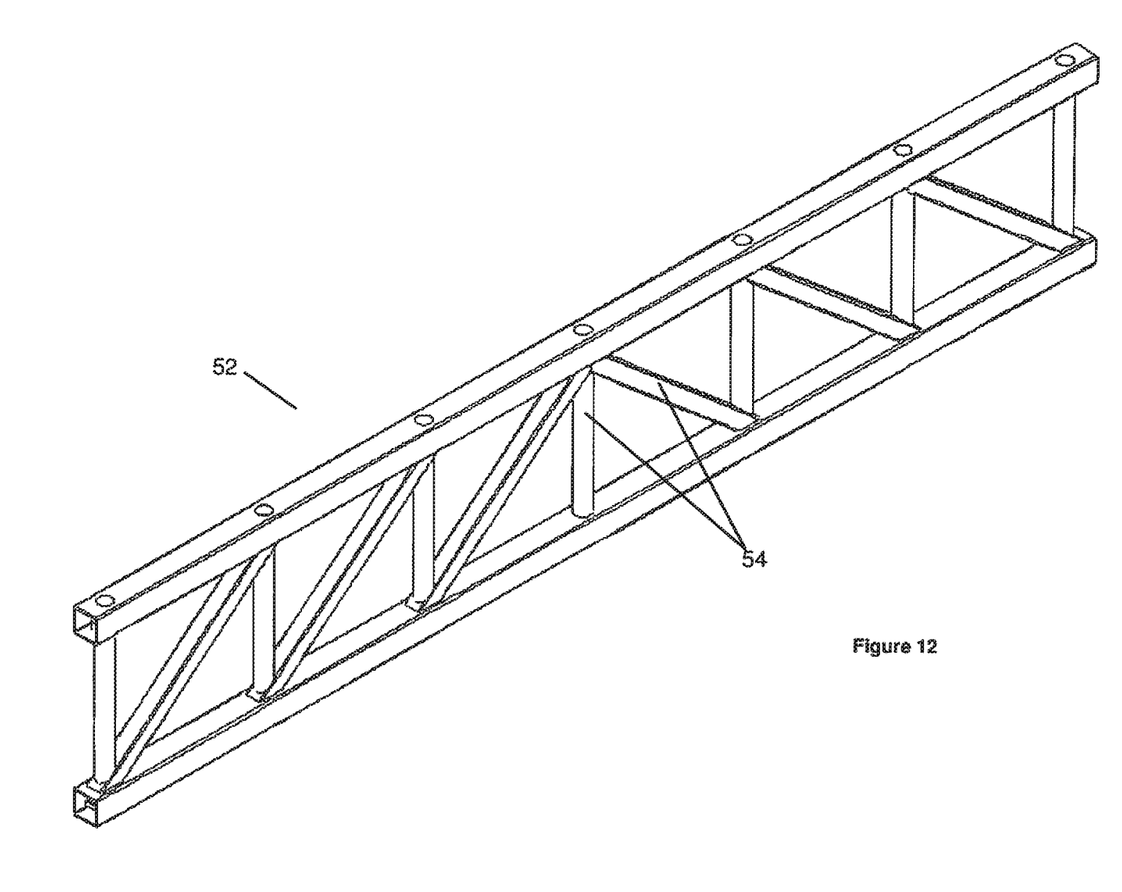
FIG. 12 shows a Howe truss according to another embodiment.
Figure 13:
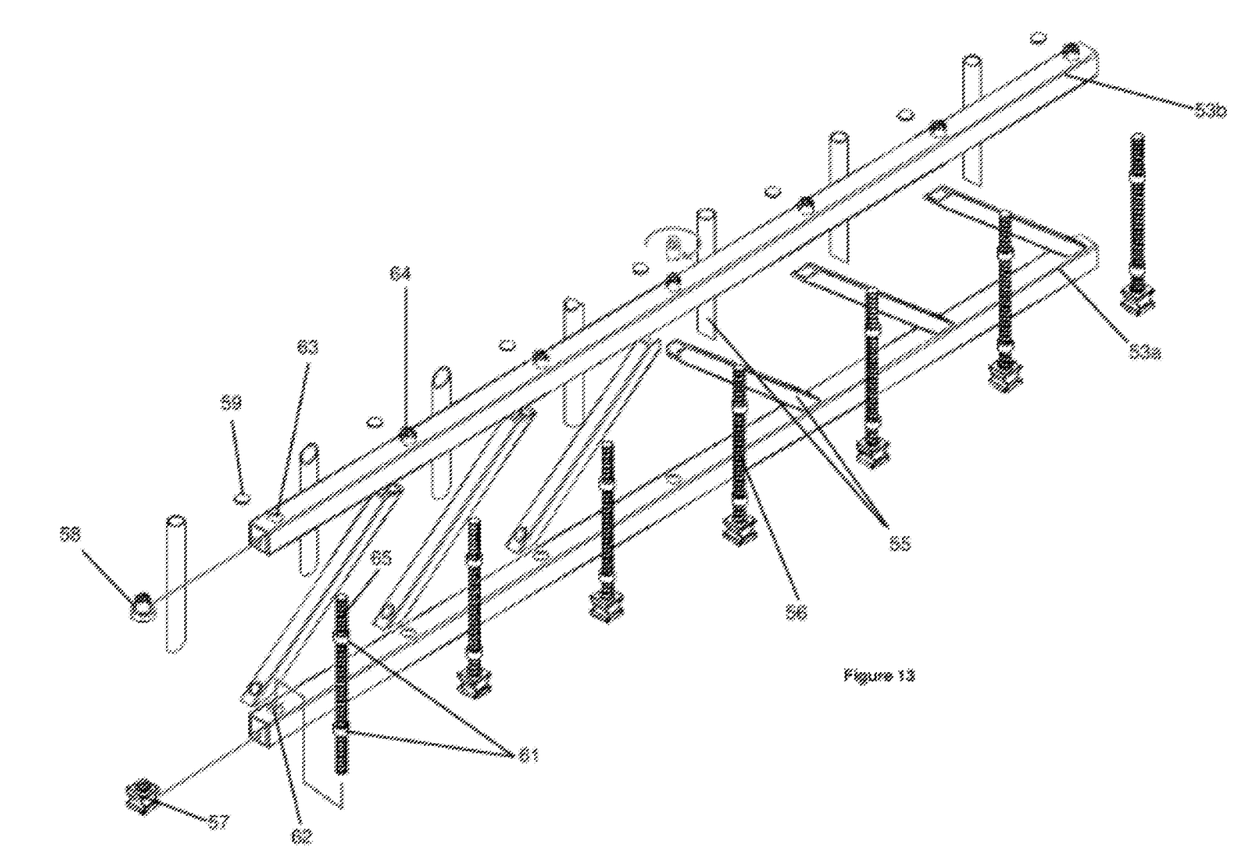
FIG. 13 shows an exploded view of the Howe truss of FIG. 12.

FIGS. 12 and 13 show an embodiment (one in assembled view and one in exploded view) comprising a Howe truss 52 made entirely out of FRP, whose components comprise two parallel chords 53a, 53b, a plurality of diagonal and vertical webs 54, each web comprising a tube or square profile hollow-section 55 and each vertical web further comprising a threaded rod 56, a plurality of cuboid nuts 57, a plurality of spacer nuts 58, a plurality of end nuts 64 and a plurality of rings 59. Each threaded rod 56, further comprises two nuts 61 threaded on to each end of the threaded rod. The opposing inner and outer sides of the chords 53a, 53b are lined with pairs of opposing aligned holes 62, 63 (of which only the holes in the upper sides are shown).

During assembly, each of the plurality of cuboid nuts 57 is inserted into an end of one chord 53a and aligned with a corresponding pair of holes 62 and with corresponding webs 55. To assist with the alignment, each cuboid nut is provided with a raised ring on at least one surface configured to slot loosely into one of the holes on the outer side of the chord. The raised ring provides additional shear resistance that would not be provided by the threaded rod alone.

Each of the plurality of threaded rods 56 is inserted into the corresponding aligned webs 55, holes 62 and cuboid nuts 57, leaving threaded end sections 65 extending from the opposing end of the vertical webs. Each of the plurality of spacer nuts 58 is inserted into the other chord 53b and aligned with a corresponding pair of holes 63, each pair of holes 63 is further aligned with the threaded end sections 65 of the threaded rods 56. Chord 53b is placed onto the threaded end sections 65 such that each threaded end section 65 passes through a hole on the inner side of the chord 53b, through a spacer nut 58 but not through a hole 63 on the outer side of the chord 53b. Each of the plurality of rings 59 and each of the plurality of end nuts 64 is slotted into a corresponding hole 63 and onto a threaded end section 65. Each end nut 64 is tightened. By tightening the end nuts 64, suitable tension and compression is achieved.

It will be appreciated by the person skilled in the art that various modifications may be made to the above described embodiment without departing from the scope of the present invention. A number of non-exhaustive examples are now given.

While the embodiment described above makes use of Pratt and Warren truss designs, the invention is applicable to other truss designs. Indeed, the invention is applicable to a variety of non-truss structures in which FRP components are to be secured together. One example might be a "T" shaped structure, where the vertical and horizontal components are closed cross-section FRP members and a threaded rod passes through the inside of the vertical section. Threaded nuts are used at both ends of the threaded rod to put the vertical component into compression by tensioning the threaded rod.

Similarly, the invention is not restricted to the specific configuration of square and circle profile hollow-sections. It will be appreciated that the hollow-section profiles can be any other shaped profiles as well.

While hollow spacers are used in the above embodiment to brace the chords, it will be appreciated that these may be nuts or spacer tubes or any other spacing device that performs the same function, including bars, broken cylinders etc.

In the above embodiments, a rod is used to align the spacers. It will be appreciated that other example embodiments where the spacing of the spacers is constant such as a taut rope or cable may serve the same purpose.

In the above embodiments, the end nuts are on the outer side of each of the chords. It will be appreciated that using end nuts without enlarged heads in one of the chords is possible. These end nuts may be slotted entirely into the chord. The threaded rods may then be screwed into these end nuts before compression and tension is imparted by way of tightening the end nuts on the other side.

It will be appreciated that the chord of one truss may connect to the chord of another truss or to a different FRP component in any one of three orthogonal directions, perpendicular to any chord face or chord end. A chord end may be configured to connect to another chord face or chord end using a suitable nut dowelled into place. The ability to connect components in any one of three orthogonal directions enables the construction of FRP columns, grids, frames and gantries.

Whilst the use of Fibre Reinforced Polymer is particularly advantageous in the structures described above, other materials and combinations of materials may be used. These include other polymers, metals such as aluminium, and metal alloys such as steel.

The invention claimed is:

1. A truss comprising:
   a pair of first hollow-section members;
   a plurality of second hollow-section members extending between the pair of first hollow-section members, each arranged at a respective angle to at least one of the first hollow-section members;
   a plurality of third members extending diagonally between the pair of first hollow-section members;
   a plurality of rods, each rod extending through a respective second hollow-section member and a respective third member, and having opposing first and second threaded end sections extending through or into the first hollow-section members; and
   a plurality of pairs of nuts for securing said threaded end sections to the first hollow-section members, wherein said pairs of nuts are located inside the pair of first hollow-section members, and wherein screwing each pair of nuts and the opposing threaded end sections of each rod together exerts a compressive force on each second hollow-section member and a tensile force on each rod.

2. A truss according to claim 1, the first and second hollow-section members being made of-Fiber Reinforced Polymer.

3. A truss according to claim 1, wherein each first hollow-section member defines a plurality of pairs of holes, the holes being located on opposed sides of each first hollow-section member to define a passage for the first and second threaded end sections.

4. A truss according to claim 1, wherein one or both of the first hollow-section members comprises a plurality of spacers located within one or both of the first hollow-section members in order to brace one or both of the first hollow-section members against a compressive force applied across one or both of the first hollow-section members by the tightening of the nuts.

5. A truss according to claim 4 and comprising a bar for insertion through one or both of the first hollow-section members, said spacers being integral with or fixed to the bar.

6. A truss according to claim 1, wherein the pair of nuts and the plurality of rods are made of Fiber Reinforced Polymer.

7. A kit of parts for constructing a truss comprising:
at least two hollow-section Fiber Reinforced Polymer (FRP) chords;
a first plurality of hollow section FRP webs;
a plurality of rods having threaded end sections and configured to be located coaxially within respective first plurality of hollow section FRP webs;
a second plurality of hollow section FRP webs configured to be coupled between adjacent hollow section FRP webs of said first plurality of hollow section FRP webs and the opposed chords such that they extend at a diagonal between the chords, each of the second plurality of hollow section FRP webs having a pair of holes at each end aligned to allow a threaded end section to pass therethrough;
a plurality of pairs of end nuts for engaging with the threaded end sections of the rods to secure both the first and second plurality of hollow section FRP webs between the chords, the pairs of end nuts configured to be located inside the hollow-section FRP chords in use; and
wherein screwing of the nuts and the threaded end sections together exerts a compressive force on the chords and both the first and second plurality of hollow section FRP webs and a tensile force on the rods.

8. A kit of parts according to claim 7, wherein each chord defines pairs of holes at intervals spaced apart along the length of the chord and each pair of holes comprises aligned holes in opposed sides of the chord such that a threaded end section or associated nut is able to pass through one or both of the holes of a pair of holes.

9. A kit of parts according to claim 7, wherein said hollow-section chords and both the first and second plurality of hollow section FRP webs comprise pultruded FRP.

10. A kit of parts according to claim 7, wherein said rods and said nuts comprise FRP.

11. A method of assembling a kit of parts for constructing a truss, the kit of parts having:
at least two hollow-section Fiber Reinforced Polymer (FRP) chords;
a first plurality of hollow section FRP webs;
a plurality of rods having threaded end sections and configured to be located coaxially within the respective first plurality of hollow section FRP webs;
a second plurality of hollow section FRP webs configured to be coupled between adjacent hollow section FRP webs of said first plurality of hollow section FRP webs and the opposed chords such that they extend at a diagonal between the chords, each of the second plurality of hollow section FRP webs having a pair of holes at each end aligned to allow a threaded end section to pass therethrough; and
a plurality of end nuts for engaging with the threaded end sections of the rods to secure both the first and second plurality of hollow section FRP webs between the chords and wherein the pairs of end nuts configured to be located inside the hollow-section FRP chords in use, wherein the method comprises:
engaging said end nuts with respective threaded end sections of the rods, about or within the chords, and screwing the nuts and the threaded end sections together to exert a compressive force on the chords and both the first and second plurality of hollow section FRP webs and a tensile force on the rods.

12. A method according to claim 11, wherein said rods and nuts comprise Fiber Reinforced Polymer.

* * * * *